W. Reynolds.
Artificial-Teeth.
Nº 72541         Patented Dec. 24, 1867.
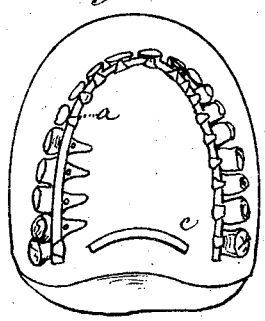
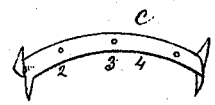
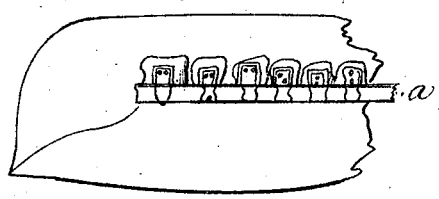
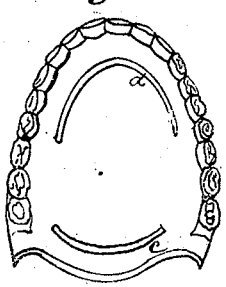
Witnesses
H. W. Beagle
W. E. Stumph
Inventor
William Reynolds by
Wm. W. Boyce Atty

United States Patent Office.

WILLIAM REYNOLDS, OF COLUMBIA, SOUTH CAROLINA.

Letters Patent No. 72,541, dated December 24, 1867.

---

IMPROVEMENT IN MANUFACTURE OF ARTIFICIAL TEETH.

---

The Schedule referred to in these Letters Patent and making part of the same.

---

TO ALL WHOM IT MAY CONCERN:

Be it known that I, WILLIAM REYNOLDS, of Columbia, in the county of Richland, and State of South Carolina, have invented a new and improved Mode of Constructing Artificial Dentures (sets of teeth) on vulcanite rubber or moulded metallic base; and I do hereby declare that the following is a full and exact description thereof, reference being had to the accompanying drawings, and to the letters of reference marked thereon.

The nature of my invention or improvement consists in so constructing sets of teeth on moulded base (hard rubber, for example,) that they shall possess, in a high degree, several advantages pertaining to swaged metallic plates, viz, durability, less bulk, a slight degree of elasticity, with great facility of repair.

To this end, instead of resorting to the use of teeth so frail as those specially designed for vulcanite base, I substitute single metallic-plate teeth, on account of their greater strength, facility of replacement in case of accident, and the opportunity afforded of departing, in their arrangement, from the regularity and sameness of the former. In regard to incisors and canines especially, the latter are more characteristic.

These teeth I attach to a thin bar, *a*, of gold, or other suitable metal, ranging along and near the base of the teeth on their inner side, by means of a tapering elongation, *b*, of the same piece of plate which forms the backing, and which is to be riveted upon this bar, as shown in the drawings. To render the riveting of these elongations upon the bar more easy, they are, before being riveted to the teeth, to be reduced from the point of departure, at the base of the teeth, to the extreme end, at least one-third in thickness. This thinning is most expeditiously effected by biting between rollers the end of a piece of plate, of sufficient length to line an entire set, or it may be done by pinning out each piece separately. In either case annealing becomes necessary before riveting, unless in cases where feebleness of the platinum pins suggests the propriety of soldering, which becomes seldom necessary with teeth of approved modern manufacture. A hole or two punched through these extensions, and reamed near the base of the teeth, permits of union of the rubber below with whatever may be above them, thus forming rivets, and serving as such, should the upper surface be so reduced in finishing the set as to uncover the metal. A semi-lunar notch along the sides of these extensions admits more vulcanite rubber between them, and renders them easily turned upon the bar. A hole punched through near the extremity of the extension facilitates the turning over upon the bar. These extensions are also to be bevelled along the edges, for more effectual resistance to accidental downward force. Teeth, particularly incisors and canines, acquire, when thus attached to a rigid base, a degree of saliency, which, however slight, enables them to maintain their integrity against a force which would fracture or dislodge vulcanite or cheoplastic teeth. By this method, it will be observed that the porcelain is shielded from undue pressure. Wherever this falls upon a tooth, it is first received upon the metal backing and extended attachment, and is there expended—a result to which is mainly attributable the great durability of gold-plate work, often to be met with, doing good service over a period of twenty years. The bar to which these elongations of the backings are attached fulfills other very important relations to the plate and teeth. It effectually prevents fractures from originating on the anterior and lateral portions of the plate, and retains the teeth attached to it in their true position under the spreading pressure to which they become subjected on the final screwing up of the flask.

As a general rule, full sets of teeth on a moulded base are more desirable to practitioners than partial cases, on account of their greater strength, and the liability of the latter to become fractured where the continuity of the arch is interrupted by openings for natural teeth to pass through. Hence arises the deplorable but too common practice, of a certain class of operators, of removing whatsoever teeth stand in the way of a full set, without much regard to number, or the practicability of saving them. This bar will be found so to strengthen partial sets, by embracing all openings encountered in its course, that the practice just referred to may, by its adoption, be greatly mitigated.

In combination with this bar, which so effectually protects the anterior portion and sides of the plate from fracture, I adapt, near to the posterior edge, and along its course, to such an extent as may be deemed necessary, a thin strip of gold or other metal plate, *c*, suitable for the purpose, which, producing an effect similar to that produced by the bar in front, precludes the possibility of fracture originating there. This strip is readily brought into its proper position on the model by slightly pinning the anterior edge on the beak of a small anvil, and afterwards annealing. Two points, 1 2, are to be formed at each end by notching deeply with a thin file.

One of these points turned upward will be embedded in and form a permanent attachment to the plate; the other, turned downwards, serves as a temporary hold to the model when the sheet of rubber is laid upon it.

No packing of rubber is required, except a thin slip under the bar, and an additional strip above the extensions of the backings, before the full sheet is laid on. Under the posterior metal strip no vulcanite rubber need be placed, nor under an anterior one, $d$, when used, the intention being that they shall appear on the lingual surface of the plate when finished. In addition to the hold given by the bent points at each end of the strips, the edges should be bevelled, for greater security, and, if deemed necessary, they may, by punching a few holes, 2 3 4, and reaming these, cause the rubber to form rivets along their whole length. Vulcanite teeth may be attached to their base by this method as securely as plate-teeth, but their liability to fracture remains the same, unprotected, as they would still be, by the absence of metal backing.

The admirable adaptation of this method to under sets needs not to be enlarged upon. The mode of constructing them, and loading with a bar of block-tin, (the best material for thus loading,) is fully shown in fig. 2. For partial lower cases, as where the front teeth and canines remain, the rest being lost, this method greatly multiplies the probabilities of succeeding in affording a comfortable case. The bar passing from one side to the other, behind the natural teeth, and attached, as above described, to the artificial teeth on each side, whilst adding vastly to the strength, obviates the encroachment which the tongue experiences from moulded plates, which of necessity have to be cumbersome at this point.

For all the purposes where metal is used, (except the tin bar for under sets,) gold is to be preferred. Silver is too easily destroyed in vulcanizing to be admissible. Platinum is too soft. Aluminium or its compounds may be found to answer; or any other metals of sufficient strength, when rendered thin enough for the purpose and for use in the human mouth, are not objectionable.

Besides the bar $c$, another bar, $d$, similar in all respects, may be made use of, and, when employed, should be placed more toward the front of the plate, for its better protection in cases where the bar, adapted to metallic backs, is dispensed with, and teeth designed for moulded-plate work are used.

Having thus fully described my invention, what I claim as new, and desire to secure by Letters Patent, is—

1. The bar $a$, formed of gold or other suitable metal, adapted for the prevention of fractures in the anterior and lateral portions of the plates, and as an attachment for the teeth, substantially as described.

2. The thinned extension $b$ of the backing, of form and mode of adaptation to the bar, as herein described and shown.

WM. REYNOLDS.

Witnesses:
W. F. DE SAUSSURE,
JOHN M. MILLER.